United States Patent
Amizur et al.

(10) Patent No.: US 10,009,854 B2
(45) Date of Patent: Jun. 26, 2018

(54) TRANSMISSION POWER CONTROL FOR IMPROVED TIME-OF-FLIGHT PERFORMANCE

(71) Applicant: Intel IP Corporation, Santa Clara, CA (US)

(72) Inventors: Yuval Amizur, Kfar-Saba (IL); Uri Schatzberg, Kiryat Ono (IL); Gaby Prechner, Rishon Lezion (IL)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 15/110,841

(22) PCT Filed: Jun. 30, 2014

(86) PCT No.: PCT/US2014/044909
§ 371 (c)(1),
(2) Date: Jul. 11, 2016

(87) PCT Pub. No.: WO2015/119655
PCT Pub. Date: Aug. 13, 2015

(65) Prior Publication Data
US 2016/0337985 A1    Nov. 17, 2016

Related U.S. Application Data

(60) Provisional application No. 61/937,685, filed on Feb. 10, 2014.

(51) Int. Cl.
*H04W 52/26* (2009.01)
*H04W 52/24* (2009.01)
(Continued)

(52) U.S. Cl.
CPC .......... *H04W 52/267* (2013.01); *H04B 17/27* (2015.01); *H04W 24/02* (2013.01);
(Continued)

(58) Field of Classification Search
None
See application file for complete search history.

(56) References Cited

U.S. PATENT DOCUMENTS

2002/0054577 A1   5/2002   Gaskill et al.
2011/0003611 A1   1/2011   Haas et al.
(Continued)

FOREIGN PATENT DOCUMENTS

CN   105900497 A   8/2016
EP   2012443 A2    1/2009
(Continued)

OTHER PUBLICATIONS

"European Application Serial No. 14881622.6, Extended European Search Report dated Aug. 4, 2017", 11 pgs.
(Continued)

*Primary Examiner* — Anh Ngoc Nguyen
(74) *Attorney, Agent, or Firm* — Schwegman Lundberg & Woessner, P.A.

(57) ABSTRACT

Embodiments of a communication station and method for transmission power control for Time-of-Flight (ToF) measurements in a wireless network are generally described herein. A protocol for fine timing measurements (FTMs) optimizes location performance rather than Wi-Fi coverage area and bit error rate by limiting an allowed maximum power and hence, EVM. A user equipment (UE) comprises a transceiver configured to receive, from an initiating station, a fine timing measurement request (FTMR) message at a maximum transmit power and lowest modulation and coding scheme (MCS), measure a relative received signal strength (RSSI) for the received FTMR message, determine a maximum transmit power, where the maximum transmit power is proportional to the measured RSSI; and transmit, to the initiating station, a fine timing measurement 1 (FTM1)
(Continued)

message at the determined maximum transmit power and received lowest MCS.

22 Claims, 5 Drawing Sheets

(51) Int. Cl.
  *H04W 52/36* (2009.01)
  *H04B 17/27* (2015.01)
  *H04W 24/02* (2009.01)
  *H04W 24/10* (2009.01)
  *H04W 72/04* (2009.01)
(52) U.S. Cl.
  CPC ......... *H04W 24/10* (2013.01); *H04W 52/245* (2013.01); *H04W 52/367* (2013.01); *H04W 72/0473* (2013.01)

(56) References Cited

U.S. PATENT DOCUMENTS

| | | | |
|---|---|---|---|
| 2012/0163261 A1 | 6/2012 | Vedantham et al. | |
| 2012/0269080 A1 | 10/2012 | Giustiniano et al. | |
| 2014/0073352 A1* | 3/2014 | Aldana | G01S 5/10 455/456.1 |
| 2014/0200026 A1* | 7/2014 | Aldana | G01S 5/0205 455/456.1 |
| 2014/0213193 A1* | 7/2014 | Zhang | G01S 11/02 455/67.11 |

FOREIGN PATENT DOCUMENTS

| | | |
|---|---|---|
| EP | 2690794 A1 | 1/2014 |
| JP | 2006191532 A | 7/2006 |
| JP | 2011525310 A | 9/2011 |
| JP | 5009977 B2 | 8/2012 |
| JP | 2013517742 A | 5/2013 |
| WO | WO-2015119655 A1 | 8/2015 |

OTHER PUBLICATIONS

"International Application Serial No. PCT/US2014/044909, International Preliminary Report on Patentability dated Aug. 25, 2016", 8 pgs.
"Korean Application Serial No. 10-2016-7018394, Office Action dated Feb. 20, 2017", With English Translation, 6 pgs.
"Korean Application Serial No. 10-2016-7018394, Response Filed Apr. 18, 2017 to Office Action dated Feb. 20, 2017", (W/ English Claims), 21 pgs.
"International Application Serial No. PCT/US2014/044909, International Search Report dated Oct. 28, 2014", 4 pgs.
"International Application Serial No. PCT/US2014/044909, Written Opinion dated Oct. 28, 2014", 6 pgs.
"Japanese Application Serial No. 2016-545840, Office Action dated Aug. 8, 2017", w/English Translation, 4 pgs.
Carlos, Aldana, "doc.:IEEE 802.11-14/0160r2", CID2164,IEEE 802.11 TGm,[online], [Online] Retrieved from the Internet : <https://mentor.ieee.org/802.11/dcn/14/11-14-0160-02-000m-proposed-resolution-for-revmc-cid-2164.doc>, (Jan. 22, 2014), 13 pgs.
"Japanese Application Serial No. 2016-545840, Response Filed Nov. 7, 2017 to Office Action dated Aug. 8, 2017", (W/ English Claims), 13 pgs.
"Korean Application Serial No. 10-2016-7018394, Notice of Preliminary Rejection dated Aug. 31, 2017", (W/ English Translation), 12 pgs.
"Korean Application Serial No. 10-2016-7018394, Response Filed Oct. 31, 2017 to Notice of Preliminary Rejection dated Aug. 31, 2017", (W/ English Claims), 19 pgs.
Philippe, Klein, "802.1AS Synchronization Services for 802.11ak Links", 14 pgs.

* cited by examiner

TRANSMISSION POWER CONTROL FOR IMPROVED TIME-OF-FLIGHT PERFORMANCE

This application is a U.S. National Stage Filing under 35 U.S.C. 371 from International Application No. PCT/US2014/044909, filed Jun. 30, 2014 and published in English as WO 2015/119655 on Aug. 13, 2015, which claims the benefit of priority to U.S. Provisional Patent Application Ser. No. 61/937,685, filed. Feb. 10, 2014, each of which is incorporated herein by reference in its entirety.

TECHNICAL FIELD

Embodiments pertain to wireless networks. Some embodiments relate to wireless networks that operate in accordance with one of the IEEE 802.11 standards including the IEEE 802.11-2012 standards. Some embodiments relate to power control in time-of-flight (ToF) positioning. Some embodiments relate to location determination. Some embodiments relate to indoor navigation.

BACKGROUND

Outdoor navigation and positioning has been widely deployed following the development of various global navigation-satellite-systems (GNSS) as well as various cellular systems. Indoor navigation and positioning differs from outdoor navigation and positioning because the indoor environment does not enable the reception of location signals from satellites or cellular base stations as accurately as in the outdoor environment. As a result, accurate and real-time indoor navigation and positioning are difficult to achieve. Solutions for indoor navigation and positioning involve time-of-flight (ToF) positioning protocols.

When using the ToF protocols for indoor positioning, link adaptation is unwanted because the client may be moving, causing rapid channel changes. Additionally, the ToF protocol might be conducted in un-associated mode. The most robust modulation protocols use lower modulation and coding schemes (MCS), and because the packets are relatively short, the coding penalty is small. When transmitting in a lower MCS, the 802.11 standard permits a higher error vector magnitude (EVM) because a higher EVM enables transmitting at higher power. Unfortunately, transmitting at the higher power drives the power amplifier (PA) to operate in a non-linear range. Although high power transmission increases Wi-Fi coverage without affecting the bit error rate, it degrades the performance of the ToF ranging measurements because the measurement quality is directly related to channel quality estimation. In certain scenarios, especially non line of sight (NLoS) scenarios, the EVM of the channel estimation is crucial.

Thus, there is a need for accurate indoor ToF navigation and positioning apparatus and methods. There are also general needs for ToF navigation and positioning apparatus and methods that optimally control transmit EVM power according to client conditions.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The word "exemplary" is used herein to mean "serving as an example, instance, or illustration." Any embodiment described herein as "exemplary" is not necessarily to be construed as preferred or advantageous over other embodiments.

The terms "communication station", "station", "handheld device", "mobile device", "wireless device" and "user equipment" (UE), as used herein, refer to a wireless communication device such as a cellular telephone, smartphone, tablet, netbook, wireless terminal, laptop computer, a femtocell, high data rate (HDR) subscriber station, access point, access terminal, or other personal communication system (PCS) device. The device may be either mobile or stationary.

The term "access point", as used herein, may be a fixed station. An access point may also be referred to as an access node, a base station, or some other similar terminology known in the art. An access terminal may also be called a mobile station, a user equipment (UE), a wireless communication device or some other similar terminology known in the art.

Figure 1:
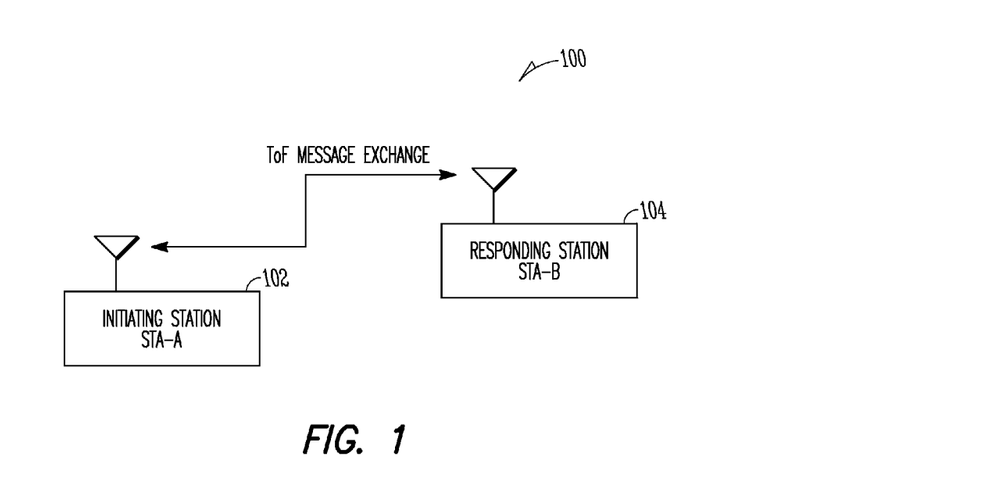
FIG. 1 is a network diagram illustrating an exemplary network environment suitable for Time-of-Flight Transmission Power Control, according to some example embodiments.

FIG. 1 is a network diagram illustrating an exemplary network environment suitable for Time-of-Flight Transmission Power Control, according to some example embodiments. Wireless network 100 includes a plurality of communication stations (STAB), which may communicate in accordance with IEEE 802.11 communication techniques. The communication stations may be access points (APs) or user equipment (UE). The UEs may be mobile devices that are non-stationary and do not have fixed locations. The APs may be stationary and have fixed locations. The communication stations may include an initiating station STA-A 102 and one or more responding stations STA-B 104. The initiating station STA-A 102 may be a communication station that initiates ToF positioning with the responding station STA-B 104 to determine its location. The Time-of-Flight Transmission Power Control procedure may include the exchange of messages as described in more detail below in FIGS. 5-6.

In some embodiments, the initiating station STA-A 102 may be a positioning station and may determine its location relative to one or more responding stations STA-Bs 104 (e.g., cooperating stations and/or one or more access points). The cooperating stations may be either IEEE 802.11 configured communication stations (STAB) or APs. In other embodiments, the initiating station STA-A 102 may determine its location in geo-coordinates. In some embodiments, the responding station STA-B 104 may be able to determine its location either in relative or in geo-coordinates.

Figure 2:
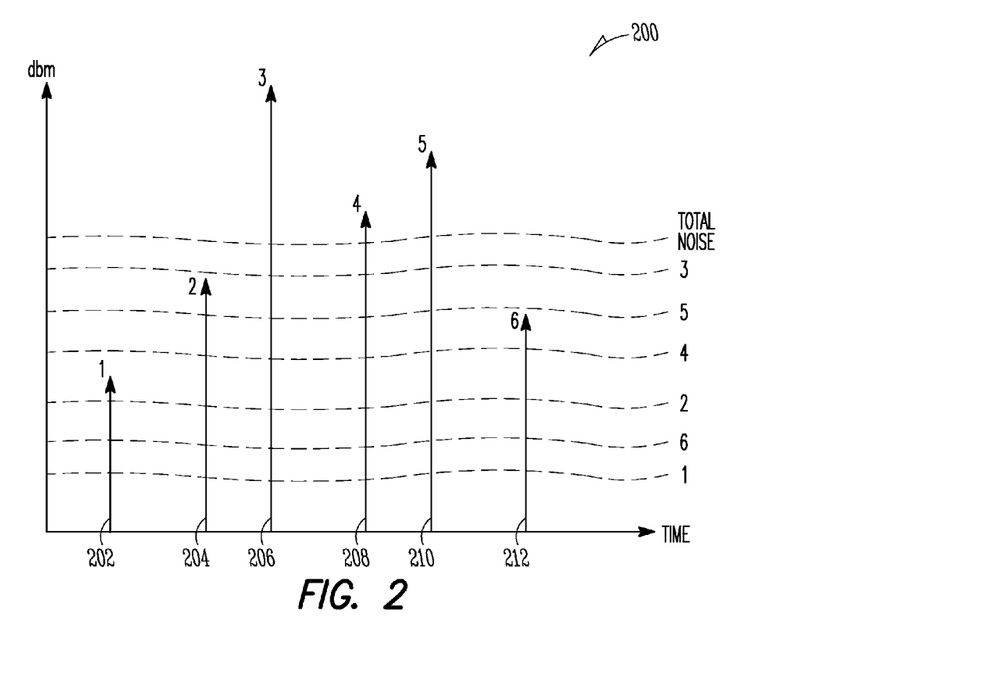
FIG. 2 illustrates channel estimation in Time-of-Flight Transmission Power Control, according to some example embodiments.

FIG. 2 illustrates channel estimation in Time-of-Flight Transmission Power Control 200, according to some example embodiments. Each signal path 202-212 is received at the receiver with a different amplitude along with its noise, which are both determined by environment. In an exemplary embodiment, transmit (Tx) EVM may be −10 decibel milli-watts (dBm) in a NLoS scenario. The direct path component 212 in the channel may be much lower than the strongest path 206. If the direct path 212 is low enough to be obscured by the direct path noise 202, its signal arrival time cannot be estimated correctly, causing an error in the ToF measurement. However, if the EVM is much lower than the direct path noise 202, the signal time of arrival may be correctly calculated even in difficult conditions because the SNR is much higher. Optimally controlling the ToF signal Tx EVM (power) according to the client conditions is detailed in FIGS. 3-8.

Figure 3:
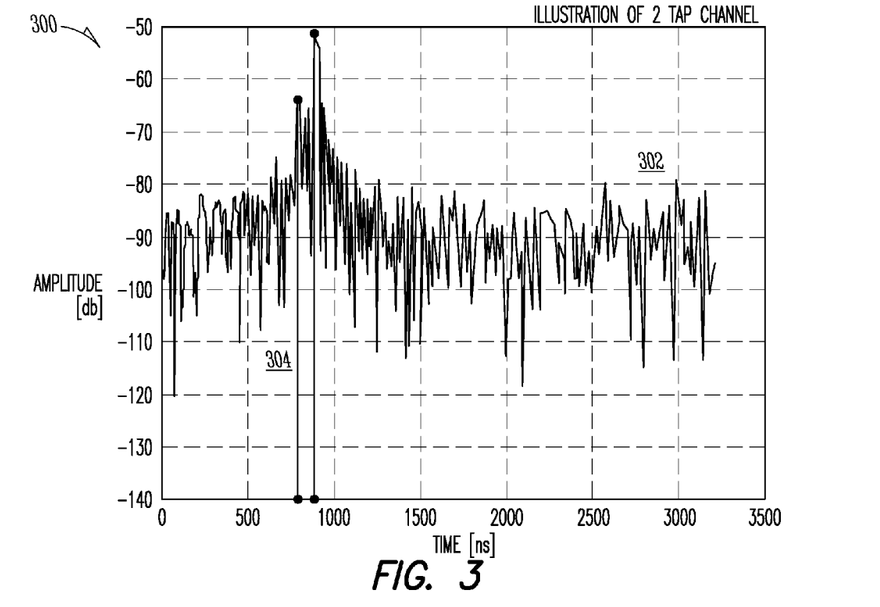
FIG. 3 illustrates channel performance in Time-of-Flight Transmission Power Control, in accordance with some exemplary embodiments.

FIG. 3 illustrates channel performance in Transmission Power Control for improved Time-of-Flight Positioning 300, in accordance with an exemplary Music algorithm embodiment. A two tap channel 302 having a first Line of Sight (LoS) tap weaker than a second tap is illustrated in a time versus dB graph with a 17 dB SNR Tx (colored) noise error 304. Exemplary potential channel degradation scenarios for this channel are detailed in FIG. 4

Figure 4:
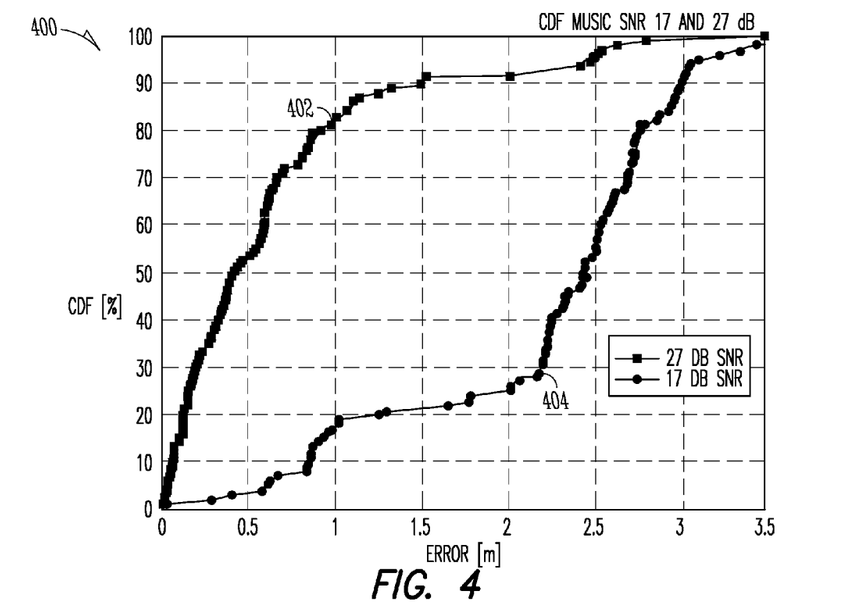
FIG. 4 illustrates potential channel degradation in Time-of-Flight Transmission Power Control, in accordance with some exemplary embodiments.

FIG. 4 illustrates an exemplary performance error difference 400 between a currently implemented transmission 404 having a low MCS and high EVM, compared to a power controlled transmission 402 having a low EVM for the exemplary channel shown transmitting Music in FIG. 3. Both signals show potential degradation in location performance due to the colored noise (Tx noise). ToF power controlled signal 402 is received at a 27 dB SNR, while signal 404 is received at a 17 dB SNR because the PA for signal 404 has been driven into its non-linear range during transmission. As shown, signal 404, transmitted at a high EVM, may reach a larger WiFi coverage area but exhibits a far higher error rate than the same signal transmitted at a low EVM. While error correction may restore a signal having a high EVM 404 to an acceptable quality for communication, it does not have sufficient quality for an accurate Fine Timing Measurement (FTM).

The disclosed ToF Transmission Power Control protocol for fine timing measurements (FTMs) optimizes location performance rather than Wifi coverage area and bit error rate by limiting an allowed maximum EVM. Three approaches for determining the maximum allowed EVM for ToF measurement transmission comprise a fixed approach, an implicit approach, and an explicit approach embedded in a novel FTM messaging protocol. These approaches and an exemplary ToF Transmission Power Control messaging protocol are detailed in FIGS. 5 and 6, respectively.

Figure 5:
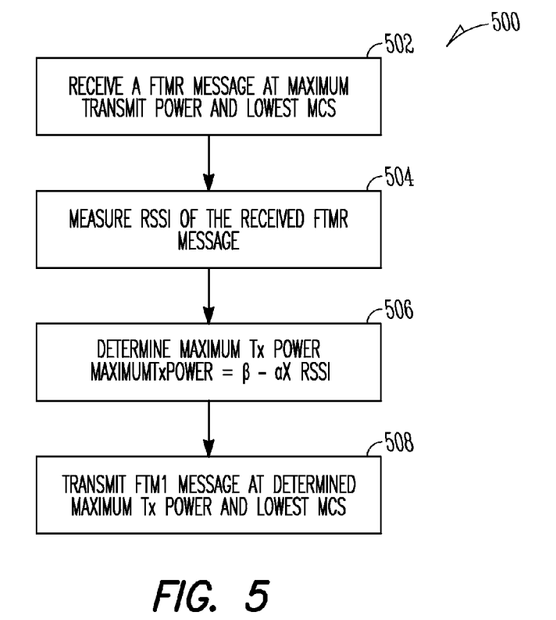
FIG. 5 shows a block diagram of a high level overview flow chart of a responder determined Time-of-Flight Transmission Power Control, according to some example embodiments.

FIG. 5 shows a block diagram of a high level overview flow chart of a responder determined Time-of-Flight Transmission Power Control, according to some example embodiments. Methods for calculating a maximum allowed EVM for preventing degradation in location performance caused by high EVM in low MCS, are supported in a novel ToF FTM procedure.

In one embodiment, a maximum allowed EVM (or minimum SNR) is determined by a fixed Tx power. A low EVM determined by a simple fixed Tx power needs no computation before transmitting FTM frames for a ToF measurement. However, optimal Tx power for various locations may vary due to reception power, MCS, and other factors.

In communication scenario embodiments where an optimal Tx power varies from a fixed value, an initiator or responder may determine the optimal Tx power using an updated FTM messaging protocol. An updated FTM messaging protocol comprising an FTM request message (FTMR) and its corresponding acknowledgement (ACK) followed by a fine timing measurement 1 message (FTM1) and its corresponding ACK is detailed in FIG. 6.

In an exemplary responder EVM determined embodiment, a responding station receives a FTMR message from an initiating station announcing the initiation of a fine timing measurement procedure. The FTMR is transmitted by the initiating communication station at a maximum Tx power and lowest MCS. The responding station receives the FTMR and then computes the optimal Tx power for its FTM1 reply from the received relative received signal strength (RSSI). In some embodiments, the responding station calculates a maximum allowed Tx power for an optimal EVM as:

$$\text{Maximum} TXPower = \beta - \alpha \cdot RSSI \quad \text{(Equation 1)}$$

wherein β represents the maximum power the responder is able to transmit in the lower MCS, RSSI equals the reception power of the FTMR message from the initiator, and α is an empirical factor that translates changes in the RSSI to the desired subtraction from the maximum power. Thus, Equation 1 reflects the inversely proportional relationship between RSSI and Tx power wherein, a strong RSSI results in lower Tx power and, hence EVM. The responding communication station then replies by transmitting a FTM1 message to the initiating communication station at the lowest MCS and calculated MaxTxPower transmission power.

Operations in the method 500 may be performed by the responding station STA-B 104 described above with respect to FIG. 1. The responding station may be a user equipment. As shown in FIG. 5, the method 500 includes operations 502, 504, 506, and 508. Beginning in operation 502, a responding station STA-B 104 receives a FTMR message announcing the initiation of a FTM process. The initiating station STA-A 102 transmits, and the responding station STA-B 104 receives, the FTMR message at maximum transmit power and the lowest MCS supported by the initiating station STA-A 102. Control flow proceeds to operation 504.

In operation 504, the responding station STA-B 104 measures the RSSI of the received FTMR message. Control flow proceeds to operation 506.

In operation 506, responding station STA-B 104 determines the maximum transmit power for its desired EVM derived from Equation 1, where MaximumTXPower=β−α·RSSI. Control flow proceeds to operation 508.

In operation 508, responding station STA-B 104 transmits a FTM1 message to initiating station STA-A 102 at the determined maximum transmit power and lowest MCS. The ToF measurement procedure is detailed in FIG. 7.

Figure 6:
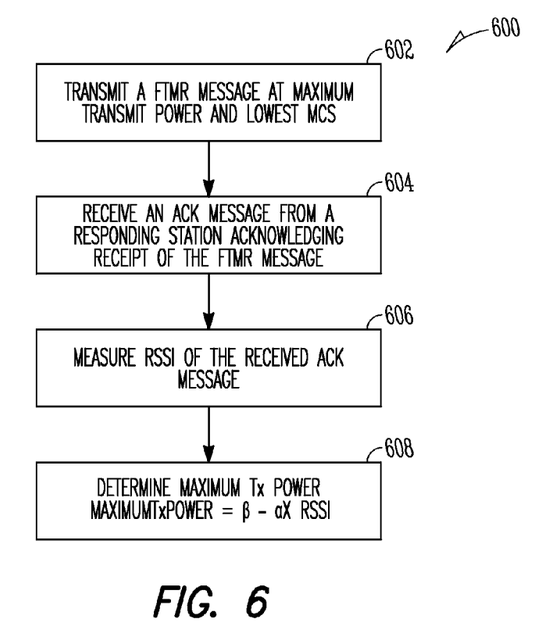
FIG. 6 shows a block diagram of a high level overview flow chart of an initiator determined Time-of-Flight Transmission Power Control, according to some example embodiments.

FIG. 6 shows a block diagram of a high level overview flow chart of an initiator determined Time-of-Flight Transmission Power Control, according to some example embodiments. In an exemplary initiator determined embodiment, the initiator may also perform the same MaximumTXPower calculation by measuring the RSSI of the FTMR ACK received from the responding station in its FTMR response. In another exemplary initiator determined embodiment, a maximum EVM (minimum SNR) of the responder is determined by the initiating station using the FTMR of the updated FTM messaging protocol. In the updated FTM protocol, a FTMR message comprises a field for either maximum EVM (minimum SNR), or alternatively, the minimum PA back-off the responder. In a current proposal, the 802.11 revision/maintenance group, the FTMR message comprises an "indication element", indicating various parameters an initiating station requests from a responding station in a requested FTM. ToF Transmission Power Control supports an indication element field for a maximum EVM (Max EVM) allowed value to be requested by the initiating station from the responding station. In the exemplary initiator determined embodiment, the max EVM field is a twos complement signed integer 1 octet in length. The max EVM value provides an upper limit on the EVM as measured at the output of the antenna connector to be used by the responding station on the current channel.

Operations in the method 600 may be performed by the initiating station STA-A 102 described above with respect to FIG. 1. As shown in FIG. 6, the method 600 includes operations 602, 604, 606, and 608. Beginning in operation 602, an initiating station STA-A 102 transmits, and a responding station STA-B 104 receives, an FTMR message at maximum transmit power and the lowest MCS supported by the initiating station STA-A 102. Control flow proceeds to operation 604.

In operation 604, The initiating station STA-A 102 receives, from the responding station STA-B 104, an ACK message acknowledging its receipt of the FTMR message. Control flow proceeds to operation 606.

In operation 606, the initiating station STA-A 102 measures the RSSI of the received ACK message. Control flow proceeds to operation 608.

In operation 608, responding station STA-B 104 determines the maximum transmit power for a desired EVM derived from Equation 1, where MaximumTXPower=$\beta-\alpha \cdot RSSI$.

Figure 7:
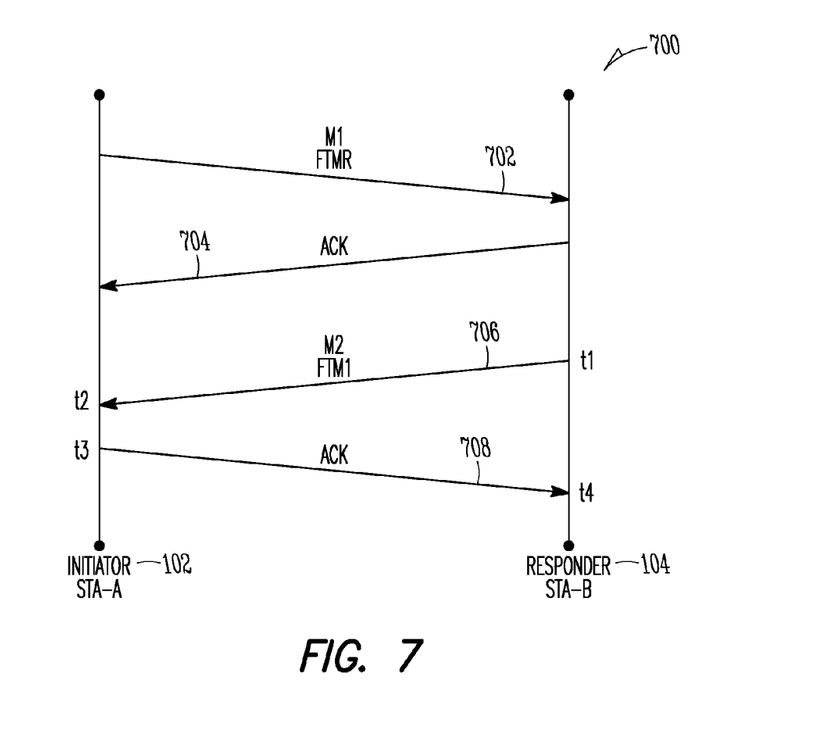
FIG. 7 illustrates a procedure for Time-of-Flight Transmission Power Control, in accordance with some exemplary embodiments.

FIG. 7 illustrates an exemplary procedure for Time-of-Flight Transmission Power Control, in accordance with some exemplary embodiments. As illustrated in FIG. 7, initiating station STA-A 102 may be arranged to transmit a fine timing measurement report (FTMR) message M1 702 carrying a management frame to responding station STA-B 104, which may respond with an ACK 704. M1 702 may be a timing measurement action frame. The timing measurement action frame may be a unicast management frame.

The FTMR message may comprise an indication element field for either maximum EVM (minimum SNR), or alternatively, the minimum PA back-off value. The indication element field provides for a maximum EVM (max EVM) allowed value to be requested by the initiating station from the responding station. In an exemplary embodiment, the max EVM field is a twos complement signed integer 1 octet in length. The max EVM value provides an upper limit on the EVM as measured at the output of the antenna connector to be used by the responding station on the current channel.

The responding station STA-B 104 may be arranged to transmit a FTM1 message M2 706 carrying a management frame to initiating station STA-A 102, which may respond with an ACK 708. M2 706 may be a timing measurement action frame. M2 706 may comprise an indication element field containing a maximum EVM (max EVM) allowed value to by the responding station STA-B 104. The timing measurement action frame may be a unicast management frame.

Figure 8:
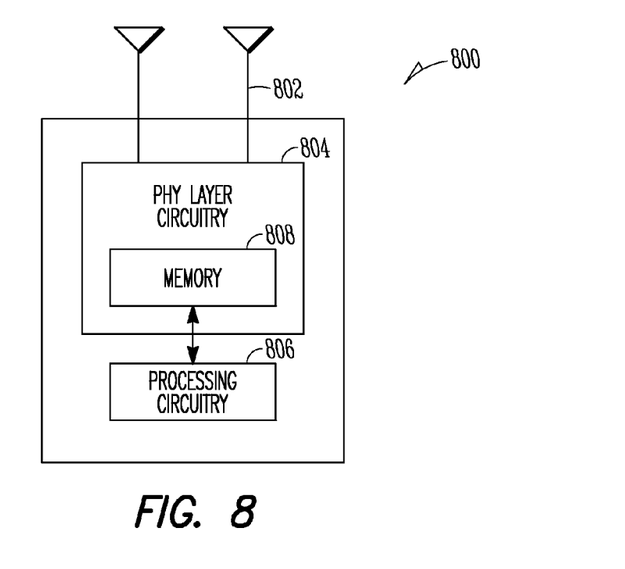
FIG. 8 shows a functional diagram of an exemplary communication station in accordance with some embodiments.

FIG. 8 shows a functional diagram of an exemplary communication station 800 in accordance with some embodiments. In one embodiment, FIG. 8 illustrates a functional block diagram of an initiating station STA-A 102 or a responding station STA-B 104 (FIG. 2) in accordance with some embodiments. Communication station 800 may also be suitable for use as a handheld device, mobile device, a cellular telephone, smartphone, tablet, netbook, wireless terminal, laptop computer, a femtocell, high data rate (HDR) subscriber station, access point, access terminal, or other personal communication system (PCS) device.

The communication station 800 may include physical medium access control layer (MAC) circuitry 804 for transmitting and receiving signals to and from other communication stations using one or more antennas 802. Communication Station 800 may also include processing circuitry 806 and memory 808 arranged to perform the operations described herein. In some embodiments, the physical layer circuitry 804 and the processing circuitry 806 may be configured to perform operations detailed in FIGS. 5-7.

In accordance with some embodiments, the MAC circuitry 804 may be arranged to contend for wireless medium configure frames or packets for communicating over the wireless medium and the PHY circuitry 804 may be arranged to transmit and receive signals. The PITY circuitry 804 may include circuitry for modulation/demodulation, upconversion/downconversion, filtering, amplification, etc. In some embodiments, the processing circuitry 806 of the communication station 800 may include one or more processors. In some embodiments, two or more antennas 802 may be coupled to the physical layer circuitry 804 arranged for sending and receiving signals. The memory 808 may store information for configuring the processing circuitry 806 to perform operations for configuring and transmitting message frames and performing the various operations described herein.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the communication station 800 may include one or more antennas 802. The antennas 802 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to implement spatial diversity and the different channel characteristics that may result between each of the antennas and the antennas of a transmitting station.

In some embodiments, the communication station 800 may include one or more of a keyboard, a display, a non-volatile memory port, multiple antennas 802, a graphics processor, an application processor, speakers, and other mobile device elements. The display may be an LCD screen including a touch screen.

Although communication station 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory memory mechanism 808 for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station STA 800 may include one or more processors and may be configured with instructions stored on a computer-readable storage device memory 808.

Figure 9:
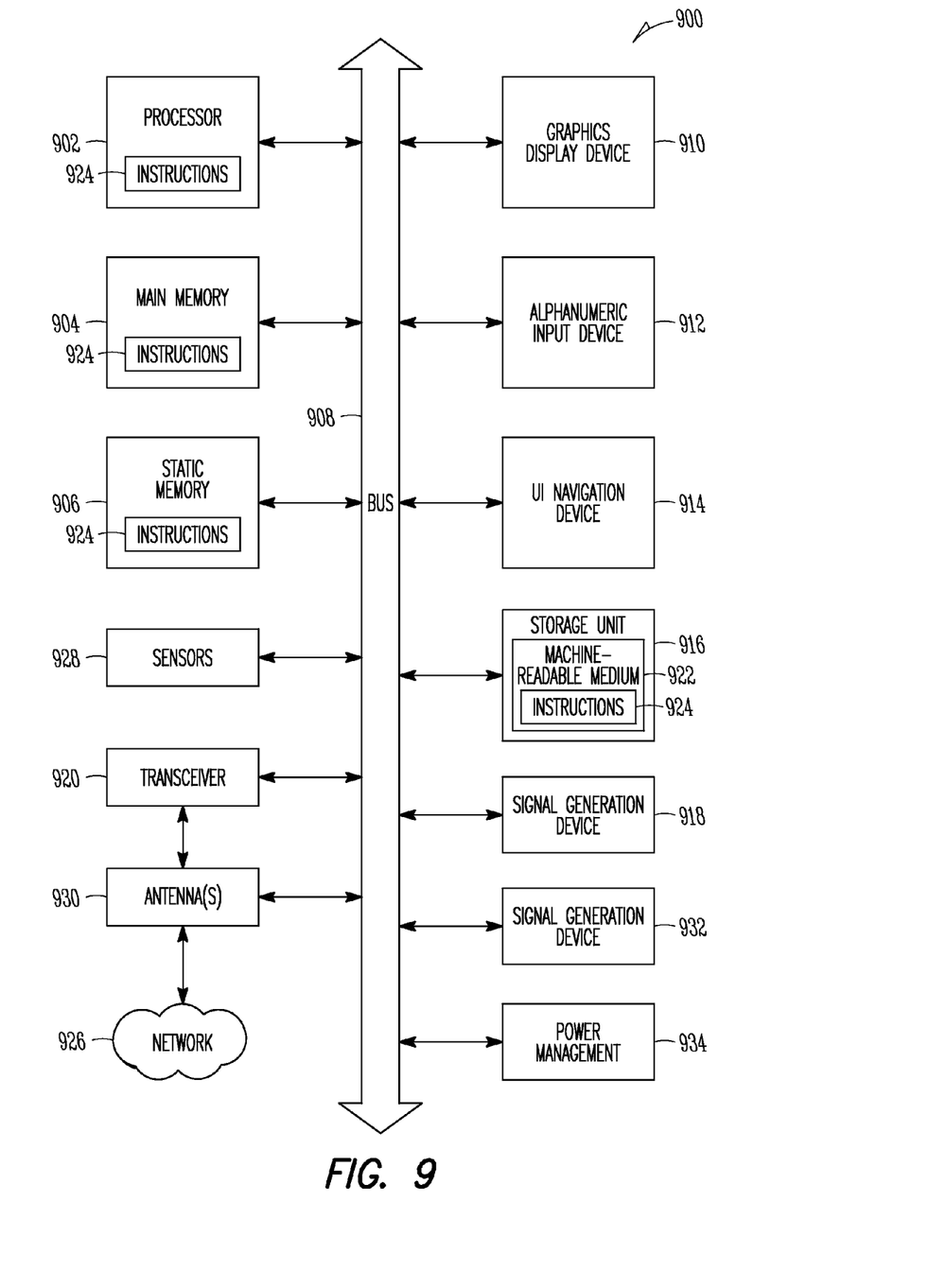
FIG. 9 shows a block diagram of an example of a machine upon which any of one or more techniques (e.g., methods) discussed herein may be performed.

FIG. 9 illustrates a block diagram of another example machine 900 upon which any one or more of the techniques (e.g., methodologies) discussed herein may performed. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 634, a graphics display device 910, an alphanumeric input device 912 (e.g., a keyboard), and a user interface (UI) navigation device 914 (e.g., a mouse). In an example, the graphics display device 910, input device 912 and UI navigation device 914 may be a touch screen display. The machine 900 may additionally include a storage device (e.g., drive unit) 916, a signal generation device 918 (e.g., a speaker), a network interface device (transceiver) 920, and one or more sensors 928, such as a global positioning system (GPS) sensor, compass, accelerometer, or other sensor.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions 924 for execution by the machine 900 and that cause the machine 900 to perform any one or more of the techniques of the present disclosure, or that is capable of storing, encoding or carrying data structures used by or associated with such instructions 924. Non-limiting machine readable medium 922 examples may include solid-state memories, and optical and magnetic media. In an example, a massed machine readable medium 922 comprises a machine readable medium 922 with a plurality of particles having resting mass. Specific examples of massed machine readable media 922 may include: non-volatile memory, such as semiconductor memory devices (e.g., electrically programmable read-only memory (EPROM), electrically erasable programmable read-only memory (EEPROM) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.11 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas 930 to connect to the communications network 926. In an example, the network interface device 920 may include a plurality of antennas 930 to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 924 for execution by the machine 900, and includes digital or analog communications signals or other intangible medium to facilitate communication of such software.

Wired communications may include serial and parallel wired mediums, such as Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF), such as based on the near field communications (NFC) standard, fnfrared (IR), optical character recognition (OCR), magnetic character sensing, or the like), short-range wireless mediums (e.g., Bluetooth, WLAN, Wi-Fi, etc.), long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA UMTS (Wideband Code Division Multiple Access Universal Mobile Telecommunications System), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rd. 8 (Pre-4G) (3rd Generation Partnership Project Release 8 (Pre-4th Generation)), 3GPP Rd. 9 (3rd Generation Partnership Project Release 9), 3GPP Rd. 10 (3rd Generation Partnership Project Release 10), 3GPP Rd. 11 (3rd Generation Partnership Project Release 11), 3GPP Rd. 12 (3rd Generation Partnership Project Release 12), 3GPP Rel. 13 (3rd Generation Partnership Project Release 13) and subsequent Releases (such as Rel. 14, Rd. 15, etc.), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard), electronic interaction via sound waves, IEEE 802.11a/b/g/n/adad/af, WiFi, WiFi for TVWS, IEEE 802.16e/m, WiMAX, or the like.

In one embodiment, A user equipment (UE) comprises a transceiver 920 configured to receive, from an initiating station, a fine timing measurement request (FTMR) message at a maximum transmit power and lowest modulation and coding scheme (MCS), measure a relative received signal strength (RSSI) for the received FTMR message, determine a maximum transmit power, wherein the maximum transmit power is proportional to the measured RSSI; and transmit, to the initiating station, a fine timing measurement 1 (FTM1) message at the determined maximum transmit power and received lowest MCS.

In another embodiment a communication station 800 is arranged to determine a maximum transmit power for fine timing measurement messages, the communication station 800 comprising physical layer circuitry 804 and processing elements to transmit, to a responding station, a fine timing measurement request (FTMR) message at a maximum transmit power and lowest modulation and coding scheme (MCS), receive, from the responding station, an acknowledgement (ACK) message acknowledging receipt of the FTMR message, measure a relative received signal strength (RSSI) for the received ACK message, and determine a maximum transmit power, wherein the maximum transmit power is proportional to the measured RSSI.

In yet another embodiment, a non-transitory computer readable storage device 916 including instructions 924 stored thereon, the instructions 924 which, when executed by a machine 900, cause the machine 900 to perform operations comprising receiving, from an initiating station, a fine timing measurement request (FTMR) message at a maximum transmit power and lowest modulation and coding scheme (MCS), measuring a relative received signal strength (RSSI) for the received FTMR message, determining a maximum transmit power, wherein the maximum transmit power is proportional to the measured RSSI, and transmitting, to the initiating station, a fine timing measurement 1 (FTM1) message at the determined maximum transmit power and received lowest MCS.

Additional Notes

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions 924 for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions 924.

The functions or techniques described herein may be implemented in software or a combination of software and human implemented procedures. The software may consist of computer executable instructions 924 stored on computer readable media 922 such as memory or other type of storage devices 916. The term "computer readable media" is also used to represent any means by which the computer readable instructions 924 may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor 902 operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. An apparatus of a communication station, the apparatus comprising: memory; and processing circuitry coupled to the memory, the processing circuitry configured to:
   decode a Fine Timing Measurement Request (FTMR) message transmitted by an initiating station with a maximum transmit power and lowest Modulation and Coding Scheme (MCS);
   measure a Relative Received Signal Strength (RSSI) for the received FTMR message;
   determine a maximum transmit power of the communication station, wherein the maximum transmit power is inversely proportional to the measured RSSI; and
   configure the communication station to transmit, to the initiating station, a Fine Timing Measurement 1 (FTM1) message at the determined maximum transmit power and the received lowest MCS.

2. The apparatus of the communication station of claim 1, wherein the maximum transmit power is determined to be equal to $\beta - \alpha*RSSI$, wherein $\beta$ represents a maximum power the communication station is able to transmit in the lowest MCS, RSSI equals the reception power of the FTMR message from the initiating station, and $\alpha$ is an empirical factor that translates changes in the RSSI to the desired subtraction from the maximum power.

3. The apparatus of the communication station of claim 1, wherein the maximum transmit power is determined from a fixed value.

4. The apparatus of the communication station of claim 1, wherein the received FTMR message comprises an Indication Element field for requesting a maximum Error Vector Magnitude (EVM) value, and wherein the processing circuitry is further configured to determine the maximum transmit power based on the maximum EVM value.

5. The apparatus of the communication station of claim 1, wherein the received FTMR message comprises an Indication Element field for requesting a minimum Power Amplifier back-off value of the communication station.

6. The apparatus of the communication station of claim 1, wherein the maximum transmit power is optimized for location performance rather than Wi-Fi coverage area.

7. The apparatus of the communication station of claim 1, wherein the communication station supports a protocol for Fine Timing Measurement (FTM) that is modified for optimizing power control of FTM messages.

8. An apparatus of a communication station, the apparatus arranged to determine a maximum transmit power for Fine Timing Measurement messages, the apparatus comprising: memory; and physical layer circuitry coupled to the memory, the physical layer circuitry configured to:
configure the communication station to transmit, to a responding station, a Fine Timing Measurement Request (FTMR) message at a maximum transmit power and lowest Modulation and Coding Scheme (MCS);
decode, from the responding station, an Acknowledgement (ACK) message acknowledging receipt of the FTMR message;
measure a Relative Received Signal Strength (RSSI) for the received ACK message; and
determine a maximum transmit power, wherein the maximum transmit power is inversely proportional to the measured RSSI.

9. The apparatus of the communication station of claim 8, wherein the maximum transmit power is determined to be equal to $\beta-\alpha*RSSI$, wherein $\beta$ represents a maximum power the communication station is able to transmit in the lowest MCS, RSSI equals the reception power of the FTMR message from the initiating station, and a is an empirical factor that translates changes in the RSSI to the desired subtraction from the maximum power.

10. The apparatus of the communication station of claim 8, wherein the maximum transmit power is determined from a fixed value.

11. The apparatus of the communication station of claim 8, wherein the transmitted FTMR message comprises an Indication Element field for requesting a maximum Error Vector Magnitude (EVM) value.

12. The apparatus of the communication station of claim 8, wherein the transmitted FTMR message comprises an Indication Element field for requesting a minimum Power Amplifier back-off value of the responding station.

13. The apparatus of the communication station of claim 8, wherein the maximum transmit power is optimized for location performance rather than Wi-Fi coverage area.

14. The apparatus of the communication station of claim 8, wherein the communication station supports a protocol for Fine Timing Measurement (FTM) that is modified for optimizing power control of FTM messages.

15. The apparatus of the communication station of claim 8, wherein the communication station is a base station or access point and the responding station is a User Equipment.

16. A non-transitory computer readable storage device including instructions stored thereon, the instructions, which when executed by a machine, cause the machine to perform operations to configure a communication station to:
decode a Fine Timing Measurement Request (FTMR) message transmitted by an initiating station with a maximum transmit power and lowest Modulation and Coding Scheme (MCS);
measure a Relative Received Signal Strength (RSSI) for the received FTMR message;
determine a maximum transmit power of the communication station, wherein the maximum transmit power is inversely proportional to the measured RSSI; and
configure the communication station to transmit, to the initiating station, a Fine Timing Measurement 1 (FTM1) message at the determined maximum transmit power and received lowest MCS.

17. The non-transitory computer readable storage device of claim 16, wherein the maximum transmit power is determined to be equal to $\beta-\alpha*RSSI$, wherein $\beta$ represents a maximum power the communication station is able to transmit in the lowest MCS, RSSI equals the reception power of the FTMR message from the initiating station, and a is an empirical factor that translates changes in the RSSI to the desired subtraction from the maximum power.

18. The non-transitory computer readable storage device of claim 16, wherein the maximum transmit power is determined from a fixed value.

19. The non-transitory computer readable storage device of claim 16, wherein the received FTMR message comprises an Indication Element field for requesting a maximum Error Vector Magnitude (EVM) value or a minimum Power Amplifier back-off value.

20. The non-transitory computer readable storage device of claim 16, wherein the initiating station supports a protocol for Fine Timing Measurement (FTM) that is modified for optimizing power control of FTM messages.

21. The apparatus of the communication station of claim 1, wherein the apparatus further comprises: transceiver circuitry coupled to the memory; and, one or more antenna coupled to the transceiver circuitry.

22. The apparatus of the communication station of claim 8, wherein the apparatus further comprises: transceiver circuitry coupled to the memory; and, one or more antenna coupled to the transceiver circuitry.

* * * * *